United States Patent
Takeuchi et al.

(10) Patent No.: US 6,975,074 B2
(45) Date of Patent: Dec. 13, 2005

(54) ELECTRON EMITTER COMPRISING EMITTER SECTION MADE OF DIELECTRIC MATERIAL

(75) Inventors: Yukihisa Takeuchi, Nishikamo-gun (JP); Tsutomu Nanataki, Toyoake (JP); Iwao Ohwada, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 10/459,416

(22) Filed: Jun. 11, 2003

(65) Prior Publication Data

US 2004/0104690 A1 Jun. 3, 2004

Related U.S. Application Data

(63) Continuation-in-part of application No. 10/405,978, filed on Apr. 2, 2003.

(30) Foreign Application Priority Data

Nov. 29, 2002 (JP) .................................... 2002-348908
May 30, 2003 (JP) .................................... 2003-154546

(51) Int. Cl.⁷ ............................................. H05B 37/00
(52) U.S. Cl. ........................ 315/167; 313/306; 313/310
(58) Field of Search ............................ 315/169.1, 169.3, 315/167; 313/495–496, 309–310, 306, 508–509, 346 R

(56) References Cited

U.S. PATENT DOCUMENTS

| | | | |
|---|---|---|---|
| 5,280,221 A | 1/1994 | Okamoto et al. | 315/169.1 |
| 5,382,867 A | 1/1995 | Maruo et al. | 313/309 |
| 5,453,661 A | 9/1995 | Auciello et al. | 315/1 |
| 5,508,590 A | 4/1996 | Sampayan et al. | 315/169.1 |

(Continued)

FOREIGN PATENT DOCUMENTS

| | | |
|---|---|---|
| DE | 3833604 | 4/1990 |
| DE | 10057072 | 5/2001 |
| EP | 0 353 632 | 2/1990 |
| EP | 428853 | 5/1991 |
| EP | 0 953 958 A2 | 11/1999 |
| FR | 2639151 | 5/1990 |
| FR | 2675306 | 10/1992 |
| FR | 2789221 | 8/2000 |
| FR | 2789223 | 8/2000 |
| JP | 44-26125 | 11/1969 |

(Continued)

OTHER PUBLICATIONS

"Pulsed Electron Source Using a Ferroelectric Cathode," Tokyo Institute of Technology, vol. 68, No. 5, Jan. 7, 1999, pp. 546–550.

Puchkarev, Victor F. and Mesyats, Gennady A., "On the Mechanism of Emission from the Ferroelctric Ceramic Cathode," Journal of Applied Physics, vol. 78, No. 9, Nov. 1, 1995, pp. 5633–5637.

Riege, H., "Electron Emission from Ferroelectrics—a Review," Nucl. Instr. and Meth. A340, 1994, pp. 80–89.

(Continued)

Primary Examiner—Thuy Vinh Tran
(74) Attorney, Agent, or Firm—Burr & Brown

(57) ABSTRACT

An electron emitter has an emitter section having a plate shape, a cathode electrode formed on a front surface of the emitter section, and an anode electrode formed on a back surface of the emitter section. A drive voltage from a pulse generation source is applied between the cathode electrode and the anode electrode through a resistor. The anode electrode is connected to GND (ground) through another resistor. A collector electrode is provided above the cathode electrode, and the collector electrode is coated with a fluorescent layer. A bias voltage is applied to the collector electrode through another resistor.

16 Claims, 22 Drawing Sheets

U.S. PATENT DOCUMENTS

| | | | |
|---|---|---|---|
| 5,666,019 A | | 9/1997 | Potter .......................... 313/306 |
| 5,726,524 A | | 3/1998 | Debe .......................... 313/309 |
| 5,729,094 A | * | 3/1998 | Geis et al. ............... 315/169.1 |
| 5,747,926 A | | 5/1998 | Nakamoto et al. .......... 313/495 |
| 5,874,802 A | | 2/1999 | Choi et al. ................... 313/495 |
| 5,877,594 A | * | 3/1999 | Miyano et al. ........... 315/169.1 |
| 5,990,605 A | * | 11/1999 | Yoshikawa et al. .......... 313/310 |
| 6,025,819 A | | 2/2000 | Xie et al. ................... 345/75.1 |
| 6,040,973 A | | 3/2000 | Okamoto et al. ............ 361/235 |
| 6,153,978 A | * | 11/2000 | Okamoto ................ 315/169.3 |
| 6,157,145 A | | 12/2000 | Vollkommer et al. ........ 315/339 |
| 6,184,610 B1 | | 2/2001 | Shibata et al. ............... 313/309 |
| 6,184,612 B1 | * | 2/2001 | Negishi et al. ............. 313/310 |
| 6,198,225 B1 | | 3/2001 | Kano et al. ............... 315/169.3 |
| 6,274,881 B1 | * | 8/2001 | Akiyama et al. .............. 257/10 |
| 6,285,123 B1 | | 9/2001 | Yamada et al. .............. 313/495 |
| 6,313,815 B1 | | 11/2001 | Takeda et al. .............. 345/75.2 |
| 6,359,383 B1 | | 3/2002 | Chuang et al. .............. 313/496 |
| 6,452,328 B1 | | 9/2002 | Saito et al. .................. 313/495 |
| 6,469,452 B2 | | 10/2002 | Seo et al. ................. 315/169.4 |
| 6,479,924 B1 | | 11/2002 | Yoo ............................ 313/310 |
| 6,514,891 B1 | * | 2/2003 | Lee ............................... 501/32 |
| 6,580,108 B1 | * | 6/2003 | Utsumi et al. ............... 257/288 |
| 2002/0060516 A1 | | 5/2002 | Kawate et al. ............... 313/495 |
| 2002/0153827 A1 | | 10/2002 | Takeuchi et al. ............. 313/495 |

FOREIGN PATENT DOCUMENTS

| | | |
|---|---|---|
| JP | 46-20944 | 6/1971 |
| JP | 59-208587 | 11/1984 |
| JP | 63-150837 A | 6/1988 |
| JP | 1-311533 A | 12/1989 |
| JP | 05-325777 | 12/1993 |
| JP | 7-147131 A | 6/1995 |
| JP | 08-111166 | 4/1996 |
| JP | 09-090882 A | 4/1997 |
| JP | 10-27539 A | 1/1998 |
| JP | 11-185600 | 7/1999 |
| JP | 11-288249 A | 10/1999 |
| JP | 2000-285801 A | 10/2000 |
| JP | 2000-310970 A | 11/2000 |
| JP | 3160213 B2 | 2/2001 |
| JP | 3214256 | 7/2001 |
| WO | 02/052600 A1 | 7/2002 |

OTHER PUBLICATIONS

U.S. Appl. No. 10/647,794, filed Aug. 25, 2003, Takeuchi et al.

U.S. Appl. No. 10/673,384, filed Sep. 26, 2003, Takeuchi et al.

U.S. Appl. No. 10/671,763, filed Sep. 26, 2003, Takeuchi et al.

U.S. Appl. No. 10/678,958, filed Oct. 3, 2003, Takeuchi et al.

U.S. Appl. No. 10/699,186, filed Oct. 31, 2003, Takeuchi et al.

U.S. Appl. No. 10/919,747, filed Aug. 17, 2001, Takeuchi et al.

U.S. Appl. No. 10/901,932, filed Jul. 29, 2004, Takeuchi et al.

U.S. Appl. No. 10/919,678, filed Aug. 17, 2004, Takeuchi et al.

U.S. Appl. No. 10/374,955, filed Feb. 25, 2003, Takeuchi et al.

U.S. Appl. No. 10/459,415, filed Jun. 11, 2003, Takeuchi et al.

U.S. Appl. No. 10/459,110, filed Jun. 11, 2003, Takeuchi et al.

U.S. Appl. No. 10/459,386, filed Jun. 11, 2003, Takeuchi et al.

U.S. Appl. No. 10/951,509, filed Sep. 28, 2004, Takeuchi et al.

U.S. Appl. No. 10/950,976, filed Sep. 27, 2004, Takeuchi et al.

U.S. Appl. No. 10/952,524, filed Sep. 28, 2004, Takeuchi et al.

U.S. Appl. No. 10/951,832, filed Sep. 28, 2004, Takeuchi et al.

Kanemaru, Seigou, "Featuring: All About Flat Displays 2000, Leading Technological Trend of FEDs," Electronic Engineering, Nikkan Kogyo Shimbun, Ltd., Jul. 2000, pp. 38–41 (with partial translation).

G. Benedek et al., "Electron Emission From Ferroelectric/Antiferroelectric Cathodes Excited by Short High-Voltage Pulses", Journal Applied Physics, vol. 81, No. 3, Feb. 1, 1997, pp. 1396–1403.

Gundel, H. et al., "Low Pressure Hollow Cathode Switch Triggered by a Pulsed Electron Beam Emitted From Ferroelectrics", Applied Physics Letter, American Institute Physics, New York, US vol. 54, No. 21, May 22, 1989, pp. 2071–2073.

Gundel, H. et al., "Time-Dependent Electron Emission From Ferroelectrics by External Pulsed Electric Fields", Journal of Applied Physics, American Institute of Physics, New York, US vol. 69, No. 2, Jan. 15, 1991, pp. 975–982.

Masatoshi Miyake et al., *"Electron Emission from Ferroelectric Cathodes Excited by Pulsed Voltage,"* Tokyo Institute of Technology, vol. 119, No. 5, 1999 pp. 622–627.

U.S. Appl. No. 10/719,521, filed Nov. 21, 2003, Takeuchi et al.

U.S. Appl. No. 10/719,596, filed Nov. 21, 2003, Takeuchi et al.

U.S. Appl. No. 10/730,754, filed Dec. 8, 2003, Takeuchi et al.

U.S. Appl. No. 10/731,901, filed Dec. 9, 2003, Takeuchi et al.

U.S. Appl. No. 10/808,258, filed Mar. 24, 2004, Takeuchi et al.

* cited by examiner

ELECTRON EMITTER COMPRISING EMITTER SECTION MADE OF DIELECTRIC MATERIAL

BACKGROUND OF THE INVENTION

1. Field of the Invention

The present invention relates to an electron emitter including a first electrode, a second electrode and an emitter section interposed between the first electrode and the second electrode. The emitter section is made of a dielectric material.

2. Description of the Related Art

In recent years, electron emitters having a cathode electrode and an anode electrode have been used in various applications such as field emission displays (FEDs) and backlight units. In an FED, a plurality of electron emitters are arranged in a two-dimensional array, and a plurality of fluorescent elements are positioned at predetermined intervals in association with the respective electron emitters.

Conventional electron emitters are disclosed in Japanese laid-open patent publication No. 1-311533, Japanese laid-open patent publication No. 7-147131, Japanese laid-open patent publication No. 2000-285801, Japanese patent publication No. 46-20944, and Japanese patent publication No. 44-26125, for example. All of these disclosed electron emitters are disadvantageous in that since no dielectric body is employed in the emitter section, a forming process or a micromachining process is required between facing electrodes, a high voltage needs to be applied between the electrodes to emit electrons, and a panel fabrication process is complex and entails a high panel fabrication cost.

It has been considered to make an emitter section of a dielectric material. Various theories about the emission of electrons from a dielectric material have been presented in the documents: Yasuoka and Ishii, "Pulsed electron source using a ferroelectric cathode", J. Appl. Phys., Vol. 68, No. 5, p. 546–550 (1999), V. F. Puchkarev, G. A. Mesyats, "On the mechanism of emission from the ferroelectric ceramic cathode", J. Appl. Phys., Vol. 78, No. 9, 1 Nov. 1995, p. 5633–5637, and H. Riege, "Electron emission ferroelectrics—a review", Nucl. Instr. and Meth. A340, p. 80–89 (1994).

In the conventional electron emitters, electrons trapped on the surface of the dielectric material, at the interface between the dielectric material and the upper electrode, and in the dielectric material by the defect level are released (emitted) when polarization reversal occurs in the dielectric material. The number of the electrons emitted by the polarization reversal does not change substantially depending on the voltage level of the applied voltage pulse.

However, the electron emission is not performed stably, and the number of emitted electrons is merely tens of thousands. Therefore, conventional electron emitters are not suitable for practical use. Advantages of an electron emitter having an emitter section made of a dielectric material have not been achieved.

SUMMARY OF THE INVENTION

It is an object of the present invention to provide an electron emitter having an emitter section made of a dielectric material in which excessive emission of electrons is suppressed for preventing damages of a first electrode or the like due to the emission of electrons, so that the electron emitter has a long service life and high reliability.

According to the present invention, an electron emitter comprises an emitter section made of a dielectric material, a first electrode formed on a first surface of the emitter section, and a second electrode formed on a second surface the emitter section. A drive voltage is applied between the first electrode and the second electrode to induce polarization reversal at least at a portion of the emitter section for emitting electrons. In the electron emitter, the emitter section may be made of a piezoelectric material, an anti-ferroelectric material, or an electrostrictive material.

Operation of the electron emitter according to the present invention will be described. Firstly, a drive voltage is applied between the first electrode and the second electrode such that the first electrode has a potential lower than a potential of the second electrode to reverse polarization of at least a portion of the emitter section. The polarization reversal causes emission of electrons in the vicinity of the first electrode. The polarization reversal generates a locally concentrated electric field on the first electrode and the positive poles of dipole moments in the vicinity the first electrode, emitting primary electrons from the first electrode. The primary electrons emitted from the first electrode impinge upon the emitter section, causing the emitter section to emit secondary electrons.

When the first electrode, the emitter section, and a vacuum atmosphere define a triple point, primary electrons are emitted from a portion of the first electrode in the vicinity of the triple point. The emitted primary electrons impinge upon the emitter section to induce emission of secondary electrons from the emitter section. The secondary electrons include electrons emitted from the solid emitter section under an energy that has been generated by a coulomb collision with primary electrons, Auger electrons, and primary electrons which are scattered in the vicinity of the surface of the emitter section (reflected electrons). In particular, if the first electrode is very thin, having a thickness of 10 nm or less, electrons are emitted from the interface between the first electrode and the emitter section.

Since the electrons are emitted according to the principle as described above, the electron emission is stably performed, and the number of emitted electrons would reach 2 billion or more. Thus, the electron emitter is advantageously used in the practical applications. The number of emitted electrons is increased substantially proportional to the drive voltage applied between the first electrode and the second electrode. Thus, the number of the emitted electrons can be controlled easily.

When the electron emitter is used as a pixel of a display, a third electrode is provided above the emitter section at a position facing the first electrode. The third electrode is coated with a fluorescent layer. Some of the emitted electrons are guided to the collector electrode to excite the fluorescent layer to emit fluorescent light from the fluorescent layer to the outside. Some of the emitted electrons are guided to the second electrode.

When the emitted electrons are guided to the second electrode, the gas near the second electrode or floating atoms (generated by evaporation of the electrode) near the second electrode are ionized into positive ions and electrons by the emitted electrons. The electrons generated by the ionization ionize the gas and the atoms of the electrode. Therefore, the electrons are increased exponentially to generate a local plasma in which the electrons and the positive ions are neutrally present.

The positive ions generated by the ionization may impinge upon the first electrode, possibly damaging the first electrode.

In the present invention, the electrons emitted from the first electrode are attracted to the positive poles, which are present as the local anode, of the dipole elements in the emitter section, negatively charging the first surface of the emitter section near the first electrode. As a result, the factor for accelerating the electrons (the local potential difference) is lessened, and any potential for emitting secondary electrons is eliminated, further progressively negatively charging the first surface of the emitter section.

Therefore, the positive polarity of the local anode provided by the dipole moments is weakened, and the intensity of the electric field between the local anode and the local cathode is reduced. Thus, the electron emission is stopped.

As described above, in the present invention, excessive emission of electrons is suppressed thereby preventing damage to the first electrode or the like due to the emission of electrons, so that the electron emitter has a long service life and high reliability.

According to one embodiment of the present invention, the second electrode is formed on a substrate, the emitter section is formed on the substrate to cover the second electrode, and the first electrode is formed on the emitter section.

Polarization reversal may occur in an electric field E applied to the emitter section represented by E=Vak/d, where d is a thickness of the emitter section between the first electrode and the second electrode, and Vak is a voltage applied between the first electrode and the second electrode. The thickness d may be determined so that the voltage Vak applied between the first electrode and the second electrode has an absolute value of less than 100V.

In the present invention, preferably, the emitter section is made of a conductor having a high evaporation temperature in vacuum. Thus, the emitter section is not evaporated into floating atoms easily due to the Joule heat, and the ionization by the emitted electrons is prevented. Therefore, the surface of the emitter section is effectively protected.

The first electrode may have a ring shape or a comb teeth shape to increase the number of electric field concentration points, i.e., triple points of the first electrode, the emitter section, and the vacuum. Thus, efficiency of electron emission is improved.

The first electrode may have a thickness of 100 nm or less. In particular, if the first electrode is very thin, having a thickness of 10 nm or less, electrons are emitted from the interface between the first electrode and the emitter section, and thus, the efficiency of the electron emission is further improved.

A protective film may be formed on the emitter section to cover the first electrode. The protective film protects the surface of the emitter section. Further, even if ionization occurs due to the electron emission, the protective film reduces the damage to the first electrode by the positive ions.

Preferably, the protective film has a thickness in the range of 1 nm to 20 nm. If the protective film is too thin, the protective film can not sufficiently protect the emitter section. If the protective film is too thick, the protective film has a small electric resistance, and the voltage between the local cathode and the local anode is small. Therefore, sufficient electric field for emitting electrons may not be generated. Further, if the protective film is too thick, the first electrode can not emit electrons.

The protective film may be made of a conductor. Preferably, the conductor has a sputtering yield of 2.0 or less at 600V in $Ar^+$. Preferably, the conductor has an evaporation temperature of 1800 K or higher in vacuum at an evaporation pressure of $1.3 \times 10^{-3}$ Pa. Thus, the protective film is not broken easily, and the protective film is not evaporated into atoms due to the Joule heat.

The protective film may be an insulator film, or a metal oxide film. Alternatively, the protective film may be made of ceramics, a piezoelectric material, an anti-ferroelectric material, or an electrostrictive material. When the electrons emitted from the first electrode are attracted to the local anode of the emitter section, the surface of the protective film is charged negatively. Therefore, the positive polarity of the local anode is weakened, the electric field between the local anode and the local cathode is weakened, and the intensity of the electric field between the local anode and the local cathode is reduced. Thus, the electron emission is stopped.

In the present invention, preferably, the change of the voltage between the first electrode and the second electrode at the time of electron emission is 20V or less.

The above and other objects, features, and advantages of the present invention will become more apparent from the following description of preferred embodiments when taken in conjunction with the accompanying drawings.

DESCRIPTION OF THE PREFERRED EMBODIMENTS

Electron emitters according to embodiments of the present invention will be described below with reference to FIGS. 1 through 22.

Electron emitters according to the embodiments of the present invention can be used in displays, electron beam irradiation apparatus, light sources, alternatives to LEDs, and electronic parts manufacturing apparatus.

Electron beams in an electron beam irradiation apparatus have a high energy and a good absorption capability in comparison with ultraviolet rays in ultraviolet ray irradiation apparatus that are presently in widespread use. Electron emitters are used to solidify insulating films in superposing wafers for semiconductor devices, harden printing inks without irregularities for drying prints, and sterilize medical devices while being kept in packages.

The electron emitters are also used as high-luminance, high-efficiency light sources such as a projector having a high pressure mercury lamp. The electron emitter according to the present embodiment is suitably used as a light source. The light source using the electron emitter according to the present embodiment is compact, has a long service life, has a fast response speed for light emission. The electron emitter does not use any mercury, and the electron emitter is environmentally friendly.

The electron emitters are also used as alternatives to LEDs in indoor lights, automobile lamps, surface light sources for traffic signal devices, chip light sources, and backlight units for traffic signal devices, small-size liquid-crystal display devices for cellular phones.

The electron emitters are also used in apparatus for manufacturing electronic parts, including electron beam sources for film growing apparatus such as electron beam evaporation apparatus, electron sources for generating a plasma (to activate a gas or the like) in plasma CVD apparatus, and electron sources for decomposing gases. The electron emitters are also used as vacuum micro devices such as high speed switching devices operated at a frequency on the order of Tera-Hz, and large current outputting devices. Further, the electron emitters are used suitably as parts of printers, such as light-emitting devices for emitting-light to a photosensitive drum, and electron sources for charging a dielectric material.

The electron emitters are also used as electronic circuit devices including digital devices such as switches, relays, and diodes, and analog devices such as operational amplifiers. The electron emitters are used for realizing a large current output, and a high amplification ratio.

Figure 1:
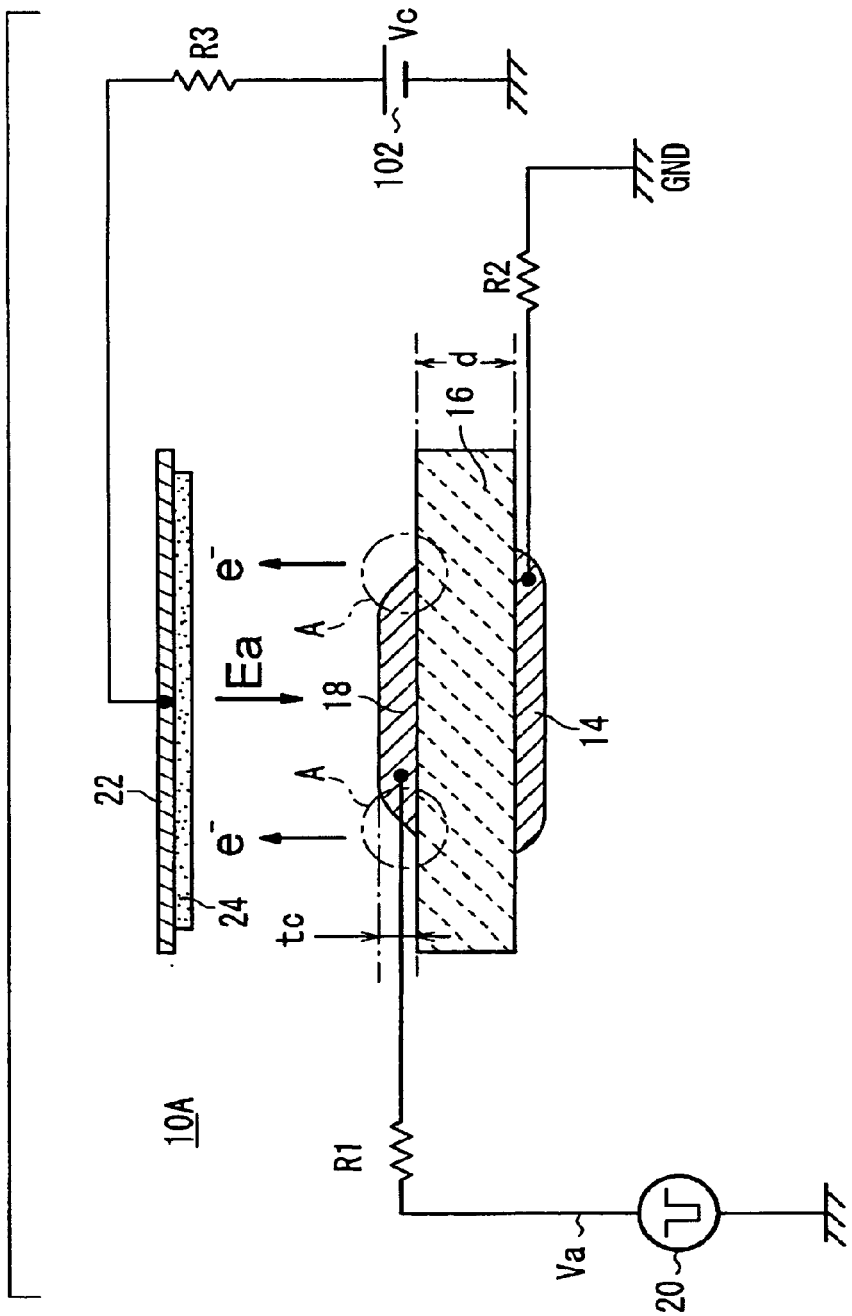
FIG. 1 is a view showing an electron emitter according to a first embodiment.

As shown in FIG. 1, an electron emitter 10A according to a first embodiment has an emitter section 16 having a plate shape, a first electrode (cathode electrode 18) formed on a front surface of the emitter section 16, and a second electrode (anode electrode 14) formed on a back surface of the emitter section 16.

Figure 2:
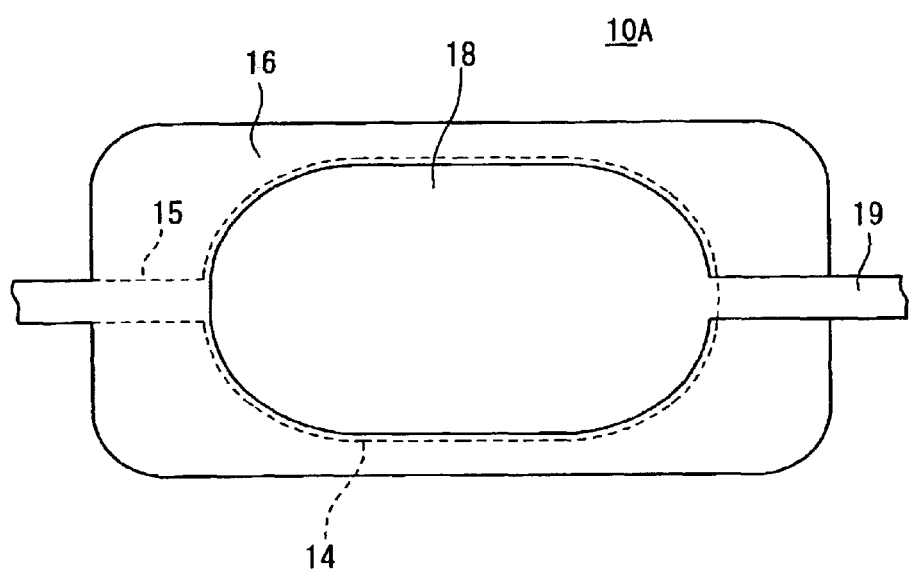
FIG. 2 is a plan view showing electrodes of the electron emitter according to the first embodiment.

A drive voltage Va from a pulse generation source 20 is applied between the cathode electrode 18 and the anode electrode 14 through a resistor R1. In an example shown in FIG. 1, the anode electrode 14 is connected to GND (ground) and hence set to a zero potential. However, the anode electrode 14 may be set to a potential other than the zero potential. As shown in FIG. 2, the drive voltage Va is applied between the cathode electrode 18 and the anode electrode 14 through a lead electrode 19 extending from the cathode electrode 18 and a lead electrode 15 extending from the anode electrode 14, for example.

For using the electron emitter 10A as a pixel of a display, a collector electrode 22 is positioned above the cathode electrode 18, and the collector electrode 22 is coated with a fluorescent layer 24. The collector electrode 22 is connected to a bias voltage source 102 (bias voltage V3) through a resistor R3.

The electron emitter 10A according to the first embodiment is placed in a vacuum space. As shown in FIG. 1, the electron emitter 10A has electric field concentration points A. The point A can be defined as a triple point where the cathode electrode 18, the emitter section 16, and the vacuum are present at one point.

The vacuum level in the atmosphere is preferably in the range from $10^2$ to $10^{-6}$ Pa and more preferably in the range from $10^{-3}$ to $10^{-5}$ Pa.

The range of the vacuum level is determined for the following reason. In a lower vacuum, (1) many gas molecules would be present in the space, and a plasma can easily be generated and, if the plasma were generated excessively, many positive ions would impinge upon the cathode electrode and damage the cathode electrode, and (2) emitted electrons would impinge upon gas molecules prior to arrival at the collector electrode, failing to sufficiently excite the fluorescent layer with electrons that are sufficiently accelerated by the collector potential (Vc).

In a higher vacuum, though electrons are smoothly emitted from the electric field concentration points A, structural body supports and vacuum seals would be large in size, posing difficulty in making a small electron emitter.

The emitter section 16 is made of a dielectric material. The dielectric material should preferably have a high relative dielectric constant (relative permittivity), e.g., a dielectric constant of 1000 or higher. Dielectric materials of such a nature may be ceramics including barium titanate, lead zirconate, lead magnesium niobate, lead nickel niobate, lead zinc niobate, lead manganese niobate, lead magnesium tantalate, lead nickel tantalate, lead antimony stannate, lead titanate, lead magnesium tungstenate, lead cobalt niobate, etc. or a material whose principal component contains 50 weight % or more of the above compounds, or such ceramics to which there is added an oxide of lanthanum, calcium, strontium, molybdenum, tungsten, barium, niobium, zinc, nickel, manganese, or the like, or a combination of these materials, or any of other compounds.

For example, a two-component material nPMN-mPT (n, m represent molar ratios) of lead magnesium niobate (PMN) and lead titanate (PT) has its Curie point lowered for a larger relative dielectric constant at room temperature if the molar ratio of PMN is increased.

Particularly, a dielectric material where n=0.85 to 1.0 and m=1.0−n is preferable because its relative dielectric constant is 3000 or higher. For example, a dielectric material where n=0.91 and m=0.09 has a relative dielectric constant of 15000 at room temperature, and a dielectric material where n=0.95 and m=0.05 has a relative dielectric constant of 20000 at room temperature.

For increasing the relative dielectric constant of a three-component dielectric material of lead magnesium niobate (PMN), lead titanate (PT), and lead zirconate (PZ), it is preferable to achieve a composition close to a morphotropic phase boundary (MPB) between a tetragonal system and a quasi-cubic system or a tetragonal system and a rhombohedral system, as well as to increase the molar ratio of PMN. For example, a dielectric material where PMN:PT:PZ= 0.375:0.375:0.25 has a relative dielectric constant of 5500, and a dielectric material where PMN:PT:PZ= 0.5:0.375:0.125 has a relative dielectric constant of 4500, which is particularly preferable. Furthermore, it is preferable to increase the dielectric constant by introducing a metal such as platinum into these dielectric materials within a range to keep them insulative. For example, a dielectric material may be mixed with 20 weight % of platinum.

As described above, the emitter section 16 may be formed of a piezoelectric/electrostrictive layer or an anti-ferroelectric layer. If the emitter section 16 is a piezoelectric/ electrostrictive layer, then it may be made of ceramics such as lead zirconate, lead magnesium niobate, lead nickel niobate, lead zinc niobate, lead manganese niobate, lead magnesium tantalate, lead nickel tantalate, lead antimony stannate, lead titanate, barium titanate, lead magnesium tungstenate, lead cobalt niobate, or the like or a combination of any of these materials.

The emitter section 16 may be made of chief components including 50 weight % or more of any of the above compounds. Of the above ceramics, the ceramics including lead zirconate is most frequently used as a constituent of the piezoelectric/electrostrictive layer of the emitter section 16.

If the piezoelectric/electrostrictive layer is made of ceramics, then lanthanum, calcium, strontium, molybdenum, tungsten, barium, niobium, zinc, nickel, manganese, or the like, or a combination of these materials, or any of other compounds may be added to the ceramics.

For example, the piezoelectric/electrostrictive layer should preferably be made of ceramics including as chief components lead magnesium niobate, lead zirconate, and lead titanate, and also including lanthanum and strontium.

The piezoelectric/electrostrictive layer may be dense or porous. If the piezoelectric/electrostrictive layer is porous, then it should preferably have a porosity of 40% or less.

If the emitter section 16 is formed of an anti-ferroelectric layer, then the anti-ferroelectric layer may be made of lead zirconate as a chief component, lead zirconate and lead stannate as chief components, lead zirconate with lanthanum oxide added thereto, or lead zirconate and lead stannate as components with lead zirconate and lead niobate added thereto.

The anti-ferroelectric layer may be porous. If the anti-ferroelectric layer is porous, then it should preferably have a porosity of 30% or less.

Strontium bismuthate tantalate is used suitably for the emitter section 16. The emitter section 16 made of strontium bismuthate tantalate is not damaged by the polarization reversal easily. For preventing damages due to the polarization reversal, lamellar ferroelectric compounds represented by a general formula $(BiO_2)^{2+}(A_{m-1}B_mO_{3m+1})^{2-}$ are used. The ionized metal A includes $Ca^{2+}$, $Sr^{2+}$, $Ba^{2+}$, $Pb^{2+}$, $Bi^{3+}$, $La^{3+}$, and the ionized metal B includes $Ti^{4+}$, $Ta^{5+}$, $Nb^{5+}$. Piezoelectric/electrostrictive/anti-ferroelectric ceramics is mixed with glass components such as lead borosilicate glass or other compounds having a low melting point such as bismuth oxide to lower the firing temperature.

The emitter section 16 may be made of a material which does not contain any lead, i.e., made of a material having a high melting temperature, or a high evaporation temperature. Thus, the emitter section 16 is not damaged easily when electrons or ions impinge upon the emitter section 16.

The thickness d (see FIG. 1) of the emitter section 16 between the cathode electrode 18 and the anode electrode 14 is determined so that polarization reversal occurs in the electric field E represented by E=V/d (V is a voltage applied between the cathode electrode 18 and the anode electrode 14). When the thickness d is small, the polarization reversal occurs at a low voltage, and electrons are emitted at the low voltage (e.g., less than 100V).

The cathode electrode 18 is made of materials described below. The cathode electrode 18 should preferably be made of a conductor having a small sputtering yield and a high evaporation temperature in vacuum. For example, materials having a sputtering yield of 2.0 or less at 600 V in $Ar^+$ and an evaporation temperature of 1800 K or higher at an evaporation pressure of $1.3 \times 10^{-3}$ Pa are preferable. Such materials include platinum, molybdenum, tungsten, etc. Further, the cathode electrode 18 is made of a conductor which is resistant to a high-temperature oxidizing atmosphere, e.g., a metal, an alloy, a mixture of insulative ceramics and a metal, or a mixture of insulative ceramics and an alloy. Preferably, the cathode electrode 18 should be composed chiefly of a precious metal having a high melting point, e.g., platinum, iridium, palladium, rhodium, molybdenum, or the like, or an alloy of silver and palladium, silver and platinum, platinum and palladium, or the like, or a cermet of platinum and ceramics. Further preferably, the cathode electrode 18 should be made of platinum only or a material composed chiefly of a platinum-base alloy. The electrode should preferably be made of carbon or a graphite-base material, e.g., diamond thin film, diamond-like carbon, or carbon nanotube. Ceramics to be added to the electrode material should preferably have a proportion ranging from 5 to 30 volume %.

Further, preferably, organic metal pastes which produce a thin film after firing, such as platinum resinate paste are used. Further, for preventing damages due to polarization reversal, oxide electrode is used. The oxide electrode is made of any of ruthenium oxide, iridium oxide, strontium ruthenate, $La_{1-x}Sr_xCoO_3$ (e.g., x=0.3 or 0.5), $La_{1-x}Ca_xMnO_3$, $La_{1-x}Ca_xMn_{1-y}Co_yO_3$ (e.g, x=0.2, y=0.05). Alternatively, the oxide electrode is made by mixing any of these materials with platinum resinate paste, for example.

The cathode electrode 18 may be made of any of the above materials by an ordinary film forming process which may be any of various thick-film forming processes including screen printing, spray coating, dipping, coating, electrophoresis, etc., or any of various thin-film forming processes including sputtering, an ion beam process, vacuum evaporation, ion plating, chemical vapor deposition (CVD), plating, etc. Preferably, the cathode electrode 18 is made by any of the above thick-film forming processes.

Figure 3:
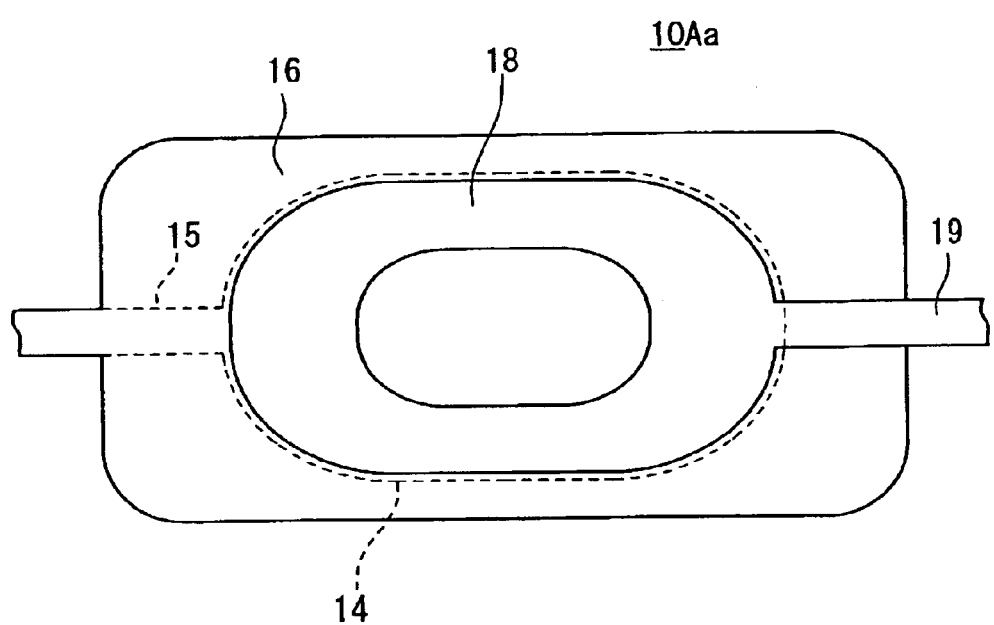
FIG. 3 is a plan view showing electrodes in a first modification of the electron emitter according to the first embodiment.
Figure 4:
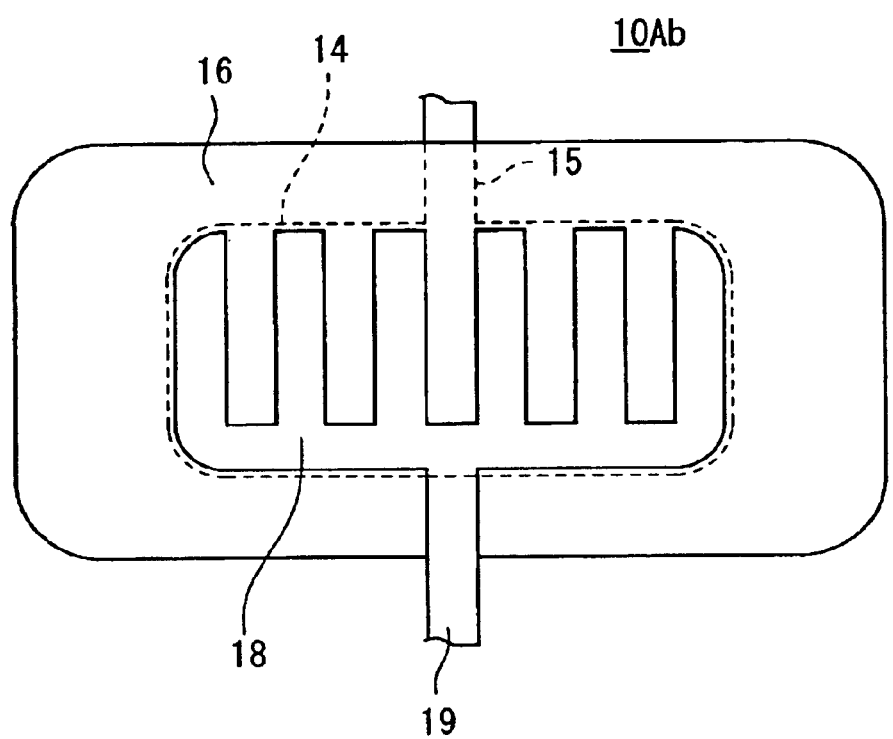
FIG. 4 is a plan view showing electrodes in a second modification of the electron emitter according to the first embodiment.

The cathode electrode 18 may have an oval shape as shown in a plan view of FIG. 2, or a ring shape like an electron emitter 10Aa of a first modification as shown in a plan view of FIG. 3. Alternatively, the cathode electrode 18 may have a comb teeth shape like an electron emitter 10Ab of a second modification as shown in FIG. 4.

When the cathode electrode 18 having a ring shape or a comb teeth shape in a plan view is used, the number of triple points (electric field concentration points A) of the cathode electrode 18, the emitter section 16, and the vacuum is increased, and the efficiency of electron emission is improved.

Figure 5:
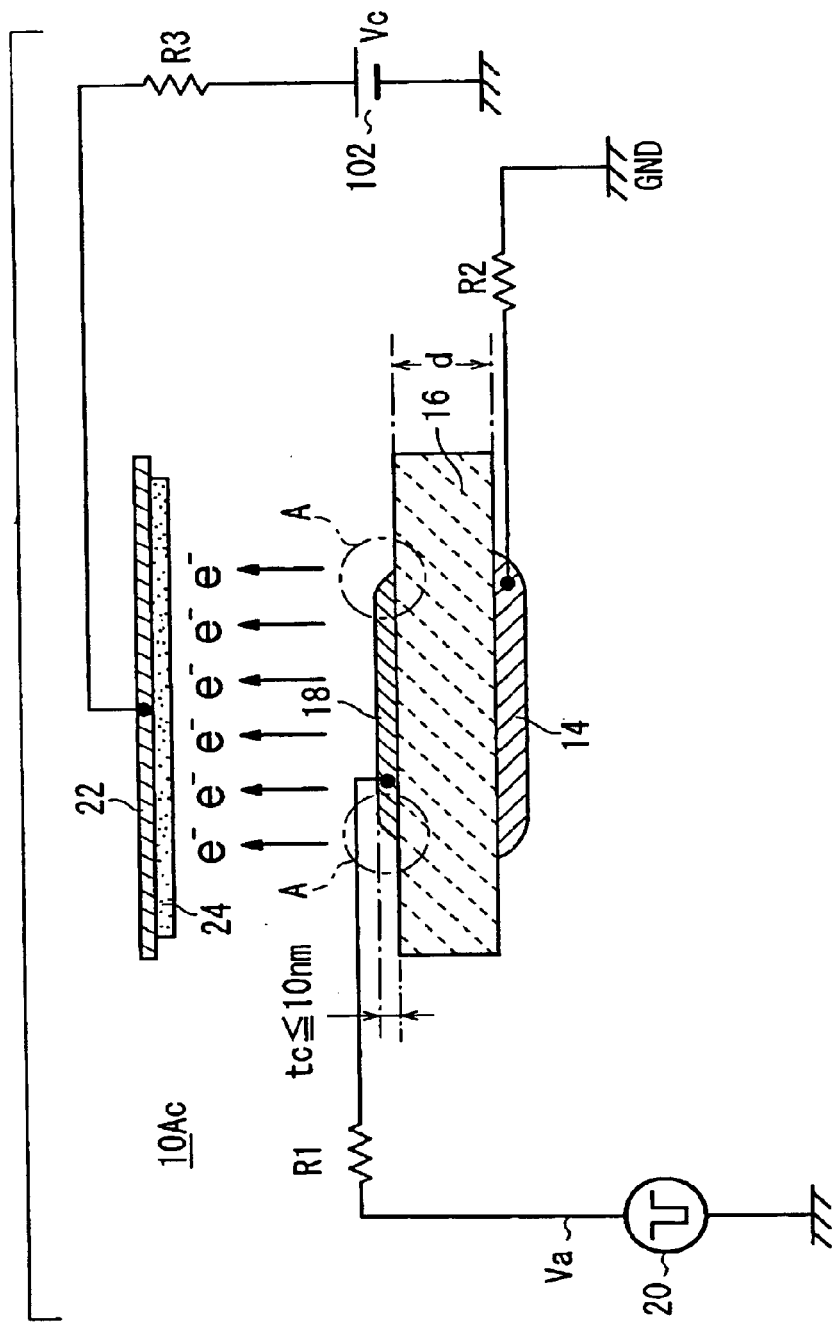
FIG. 5 is a view showing electrodes in a third modification of the electron emitter according to the first embodiment.

Preferably, the cathode electrode 18 has a thickness tc (see FIG. 1) of 20 µm or less, or more preferably 5 µm or less. The cathode electrode 18 may have a thickness tc of 100 nm or less. In particular, an electron emitter 10Ac of a third modification shown in FIG. 5 is very thin, having a thickness tc of 10 nm or less. In this case, electrons are emitted from the interface between the cathode electrode 18 and the emitter section 16, and thus, the efficiency of electron emission is further improved.

The anode electrode 14 is made of the same material by the same process as the cathode electrode 18. Preferably, the anode electrode 14 is made by any of the above thick-film forming processes. Preferably, the anode electrode 14 has a thickness tc of 20 µm or less, or more preferably 5 µm or less.

Each time the emitter section 16, the cathode electrode 18, or the anode electrode 14 is formed, the assembly is heated (sintered) into an integral structure. Depending on the process by which the cathode electrode 18 and the anode electrode 14 are formed, they may not be heated (sintered) so as to be integrally combined together.

The sintering process for integrally combining the emitter section 16, the cathode electrode 18, and the anode electrode 14 may be carried out at a temperature ranging from 500 to 1400° C., preferably from 1000 to 1400° C. For heating the emitter section 16 which is in the form of a film, the emitter section 16 should be sintered together with its evaporation source while their atmosphere is being controlled.

The emitter section 16 may be covered with an appropriate member for preventing the surface thereof from being directly exposed to the sintering atmosphere when the emitter section 16 is sintered.

Figure 6:
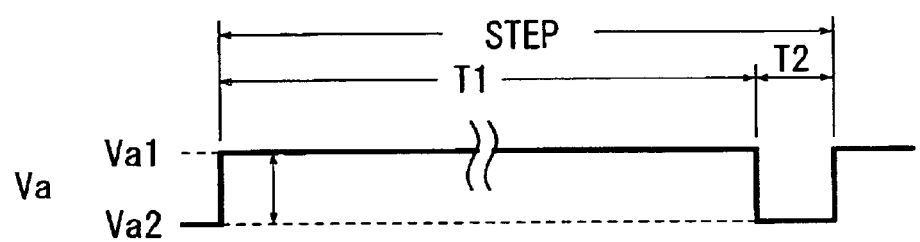
FIG. 6 is a waveform diagram showing a drive voltage outputted from a pulse generation source.

The principles of electron emission of the electron emitter 10A will be described below with reference to FIGS. 1, and 6 through 11B. As shown in FIG. 6, the drive voltage Va outputted from the pulse generation source 20 has repeated steps each including a period in which a first voltage Va1 is outputted (preparatory period T1) and a period in which a second voltage Va2 is outputted (electron emission period T2). The first voltage Va1 is such a voltage that the potential of the cathode electrode 18 is higher than the potential of the anode electrode 14, and the second voltage Va2 is such a voltage that the potential of the cathode electrode 18 is lower than the potential of the anode electrode 14. The amplitude of the drive voltage Va can be defined as the difference (=Va1−Va2) between the first voltage Va1 and the second voltage Va2.

Figure 7:
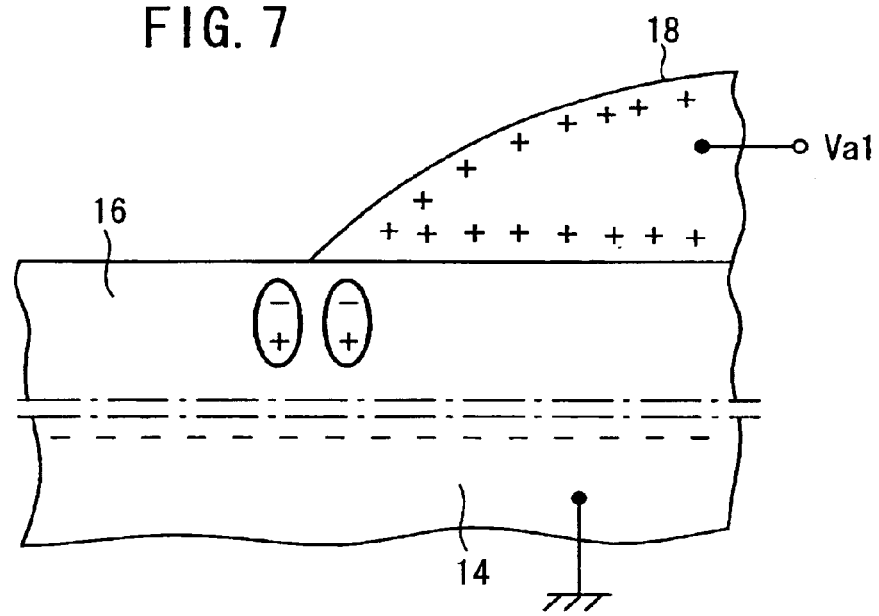
FIG. 7 is a view illustrative of operation when a first voltage is applied between a cathode electrode and an anode electrode.

The preparatory period T1 is a period in which the first voltage Va1 is applied between the cathode electrode 18 and the anode electrode 14 to polarize the emitter section 16, as shown in FIG. 7. The first voltage Va1 may be a DC voltage, as shown in FIG. 6, but may be a single pulse voltage or a succession of pulse voltages. The preparatory period T1 should preferably be longer than the electron emission period T2 for sufficient polarization. For example, the preparatory period T1 should preferably be 100 µsec. or longer.

This is because the absolute value of the first voltage Va1 for polarizing the emitter section 16 is smaller than the absolute value of the second voltage Va2 to reduce the power consumption at the time of applying the first voltage Va1, and to prevent the damage of the cathode electrode 18.

Preferably, the voltage levels of the first voltage Va1 and the second voltage Va2 are determined so that the polarization to the positive polarity and the negative polarity can be performed reliably. For example, if the dielectric material of the emitter section 16 has a coercive voltage, preferably, the absolute values of the first voltage Va1 and the second voltage Va2 are the coercive voltage or higher.

Figure 8:
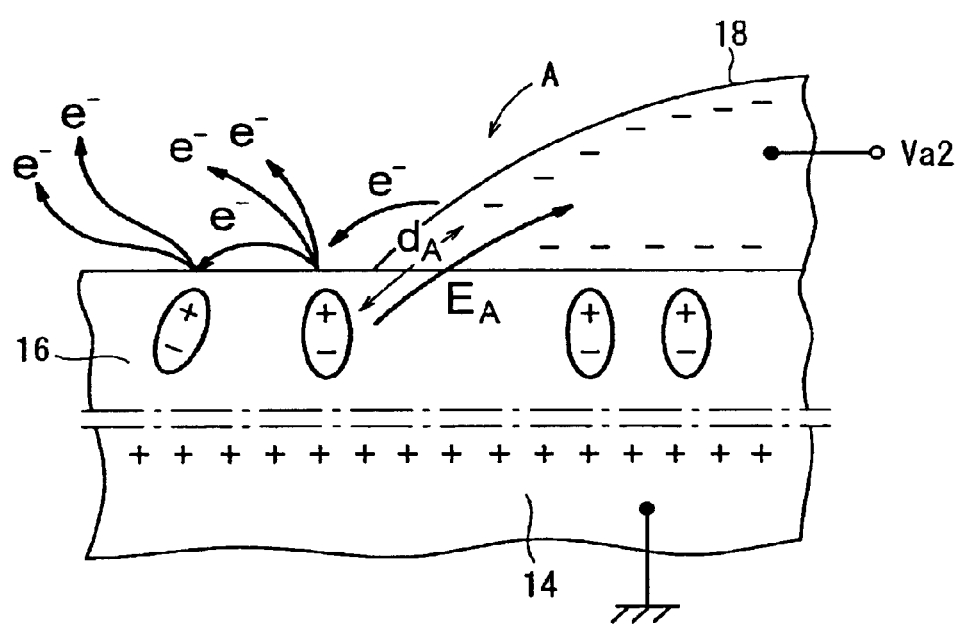
FIG. 8 is a view illustrative of operation of electron emission when a second voltage is applied between the cathode electrode and the anode electrode.

The electron emission period T2 is a period in which the second voltage Va2 is applied between the cathode electrode 18 and the anode electrode 14. When the second voltage Va2 is applied between the cathode electrode 18 and the anode electrode 14, as shown in FIG. 8, the polarization of at least a part of the emitter section 16 is reversed. Specifically, the polarization reversal occurs at a portion of the emitter section 16 which is underneath the cathode electrode 18, and a portion of the emitter section 16 which is exposed near the cathode electrode 18. The polarization likely to changes at the exposed portion near the cathode electrode 18. Because of the polarization reversal, a locally concentrated electric field is generated on the cathode electrode 18 and the positive poles of dipole moments in the vicinity thereof, emitting primary electrons from the cathode electrode 18. The primary electrons emitted from the cathode electrode 18 impinge upon the emitter section 16, causing the emitter section 16 to emit secondary electrons.

With the electron emitter 10 of the first embodiment having the triple point A where the cathode electrode 18, the emitter section 16, and the vacuum are present at one point, primary electrons are emitted from the cathode electrode 18 near the triple point A, and the primary electrons thus emitted from the triple point A impinge upon the emitter section 16, causing the emitter section 16 to emit secondary electrons. If the thickness of the cathode electrode 18 is very small (up to 10 nm), then electrons are emitted from the interface between the cathode electrode 18 and the emitter section 16.

Operation by application of the negative voltage Va2 will be described in detail below.

When the second voltage Va2 is applied between the cathode electrode 18 and the anode electrode 14, electrons are emitted from the emitter section 16. Specifically, in the emitter section 16, dipole moments near the cathode electrode 18 are charged when the polarization of the emitter section has been reversed. Thus, emission of the electrons occurs.

A local cathode is formed in the cathode electrode 18 in the vicinity of the interface between the cathode electrode 18 and the emitter section 16, and positive poles of the dipole moments charged in the area of the emitter section 16 near the cathode electrode 18 serve as a local anode which causes the emission of electrons from the cathode electrode 18. Some of the emitted electrons are guided to the collector electrode 22 (see FIG. 1) to excite the fluorescent layer 24 to emit fluorescent light from the fluorescent layer 24 to the outside. Further, some of the emitted electrons impinge upon the emitter section 16 to cause the emitter section 16 to emit secondary electrons. The secondary electrons are guided to the collector electrode 22 to excite the fluorescent layer 24.

Figure 10:
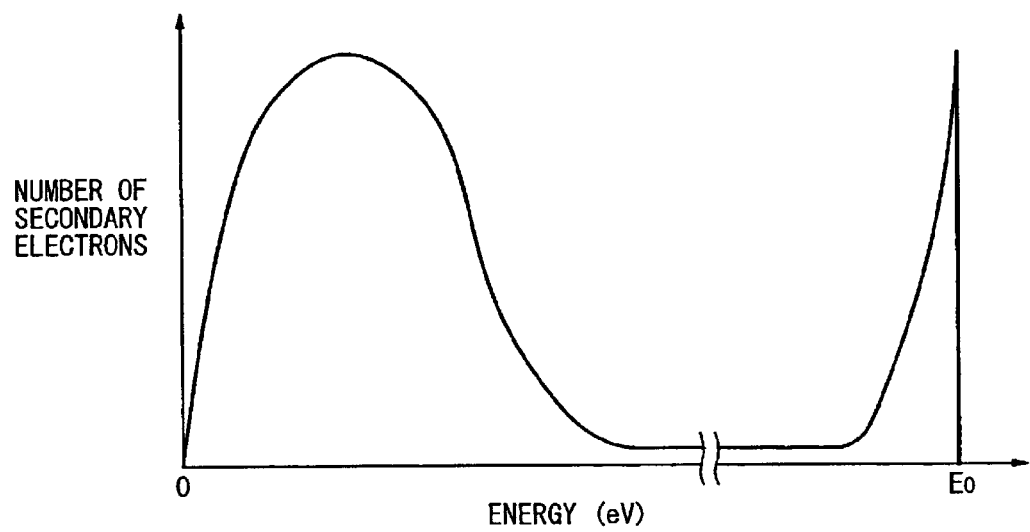
FIG. 10 is a view showing relationship between the energy of the emitted secondary electrons and the number of emitted secondary electrons.

A distribution of emitted secondary electrons will be described below with reference to FIG. 10. As shown in FIG. 10, most of the secondary electrons have an energy level near zero. When the secondary electrons are emitted from the surface of the emitter section 16 into the vacuum, they move according to only an ambient electric field distribution. Specifically, the secondary electrons are accelerated from an initial speed of about 0 (m/sec) according to the ambient electric field distribution. Therefore, as shown in FIG. 1, if an electric field Ea is generated between the emitter section 16 and the collector electrode 22, the secondary electrons have their emission path determined along the electric field Ea. Therefore, the electron emitter 10 can serve as a highly straight electron source. The secondary electrons which have a low initial speed are electrons which are emitted from the solid emitter section 16 under an energy that has been generated by a coulomb collision with primary electrons.

As can be seen from FIG. 10, secondary electrons having an energy level which corresponds to the energy $E_0$ of primary electrons are emitted. These secondary electrons are primary electrons that are emitted from the cathode electrode 18 and scattered in the vicinity of the surface of the emitter section 16 (reflected electrons). The secondary electrons referred herein include both the reflected electrons and Auger electrons.

If the thickness of the cathode electrode 18 is very small (up to 10 nm), then primary electrons emitted from the cathode electrode 18 are reflected by the interface between the cathode electrode 18 and the emitter section 16, and directed toward the collector electrode 22.

The intensity $E_A$ of the electric field at the electric field concentration point A satisfies the equation $E_A=V(la, lk)/d_A$ where V(la, lk) represents the potential difference between the local anode and the local cathode, and $d_A$ represents the distance between the local anode and the local cathode. Because the distance $d_A$ between the local anode and the local cathode is very small, it is possible to easily obtain the intensity $E_A$ of the electric field which is required to emit electrons (the large intensity $E_A$ of the electric field is indicated by the solid-line arrow in FIG. 8). This ability to easily obtain the intensity $E_A$ of the electric field leads to a reduction in the voltage Vak.

As the electron emission from the cathode electrode 18 progresses, floating atoms of the emitter section 16 which are evaporated due to the Joule heat are ionized into positive ions and electrons by the emitted electrons. The electrons generated by the ionization ionize the atoms of the emitter section 16. Therefore, the electrons are increased exponentially to generate a local plasma in which the electrons and the positive ions are neutrally present. The positive ions generated by the ionization may impinge upon the cathode electrode 18, possibly damaging the cathode electrode 18.

Figure 9:
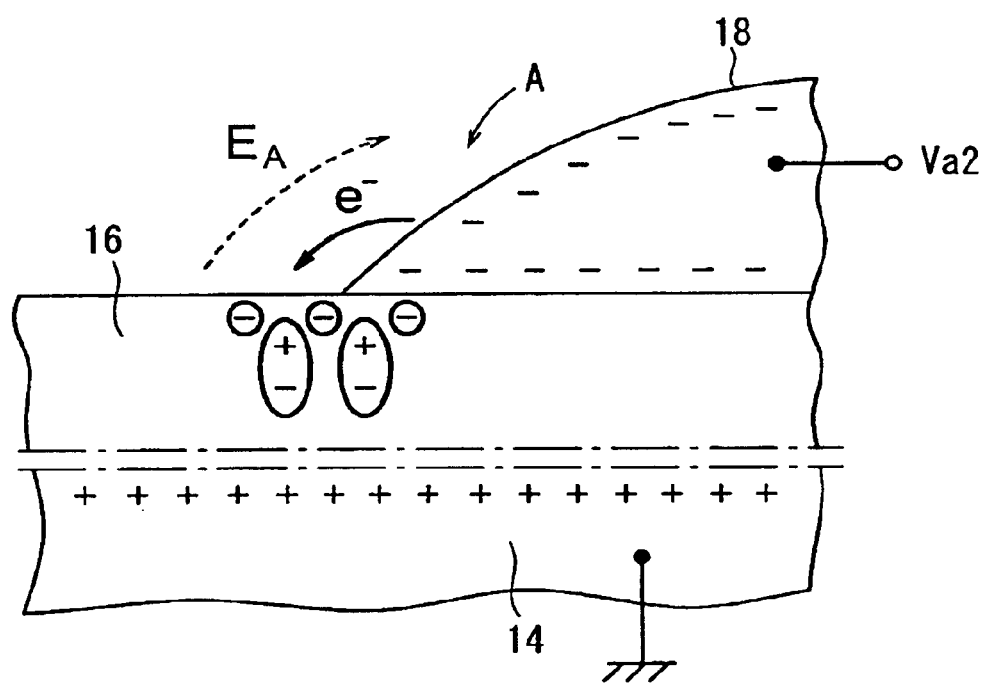
FIG. 9 is a view showing operation of self-stop of electron emission when the emitter section is charged negatively.

In the electron emitter 10A according to the first embodiment, as shown in FIG. 9, the electrons emitted from the cathode electrode 18 are attracted to the positive poles, which are present as the local anode, of the dipole elements in the emitter section 16, negatively charging the surface of the emitter section 16 near the cathode electrode 18. As a result, the factor for accelerating the electrons (the local potential difference) is lessened, and any potential for emitting secondary electrons is eliminated, further progressively negatively charging the surface of the emitter section 16.

Therefore, the positive polarity of the local anode provided by the dipole moments is weakened, and the intensity $E_A$ of the electric field between the local anode and the local cathode is reduced (the small intensity $E_A$ of the electric field is indicated by the broken-line arrow in FIG. 9). Thus, the electron emission is stopped.

Figure 11A:
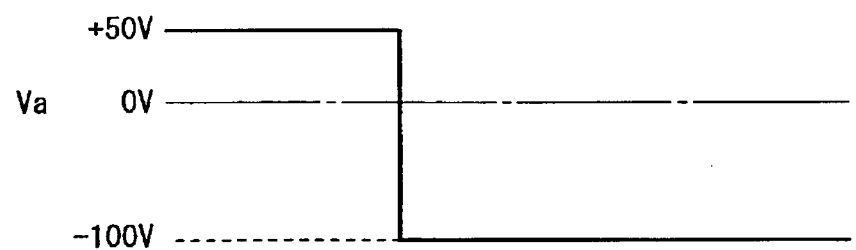
FIG. 11A is a waveform diagram showing an example of a drive voltage.
Figure 11B:
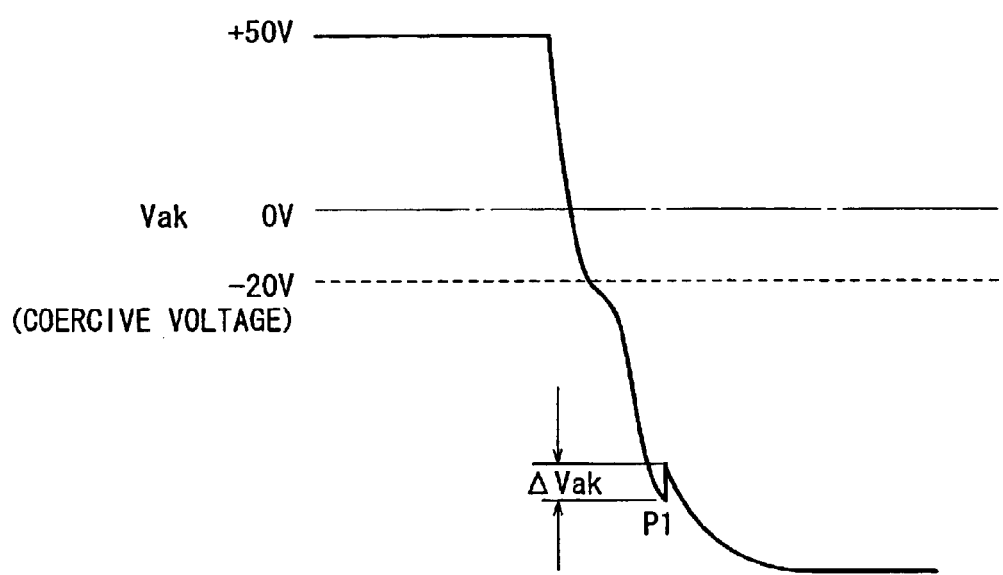
FIG. 11B is a waveform diagram showing the change of the voltage applied between an anode electrode and the cathode electrode of the electron emitter according to the first embodiment.

As shown in FIG. 11A, the drive voltage Va applied between the cathode electrode 18 and the anode electrode 14 has a positive voltage Va1 of 50 V, and a negative voltage va2 of –100V. The change ΔVak of the voltage between the cathode electrode 18 and the anode electrode 14 at the time P1 (peak) the electrons are emitted is 20V or less (about 10 V in the example of FIG. 10B), and very small. Consequently, almost no positive ions are generated, thus preventing the cathode electrode 18 from being damaged by positive ions. This arrangement is thus effective to increase the service life of the electron emitter 10A.

Preferably, the dielectric breakdown voltage of the emitter section 16 is at least 10 kV/mm or higher. In the embodiment, when the thickness d of the emitter section 16 is 20 μm, even if the drive voltage of –100V is applied between the cathode electrode 18 and the anode electrode 14, the emitter section 16 does not break down dielectrically.

The emitter section 16 is likely to be damaged when electrons emitted from the emitter section 16 impinge upon the emitter section 16 again or when ionization occurs near the surface of the emitter section 16. Due to the damages to the crystallization, the mechanical strength and the durability of the emitter section 16 are likely to be lowered.

In order to avoid the problem, preferably, the emitter section 16 is made of a dielectric material having a high evaporation temperature in vacuum. For example, the emitter section 16 may be made of $BaTiO^3$ which does not include Pb. Thus, the emitter section 16 is not evaporated into floating atoms easily due to the Joule heat, and the ionization by the emitted electrons is prevented. Therefore, the surface of the emitter section 16 is effectively protected.

Figure 12:
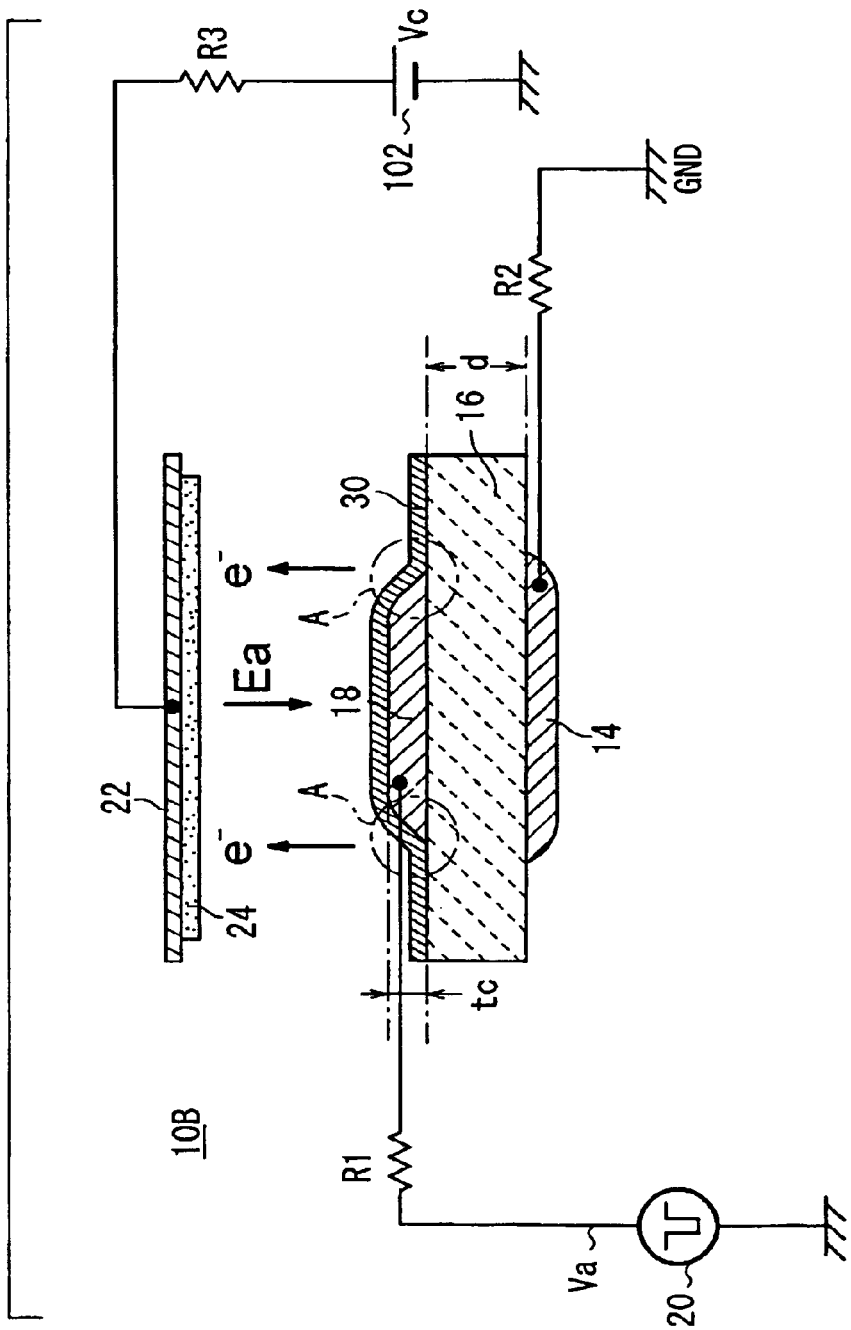
FIG. 12 is a view showing an electron emitter according to a second embodiment.

FIG. 12 is a view showing an electron emitter 10B according to a second embodiment of the present invention. The electron emitter 10B includes a protective film 30 formed on the emitter section 16 to cover the cathode electrode 18. The protective film 30 formed on the surface of the emitter section 16 prevent the emitter section 16 from being damaged due to the electrons emitted from the cathode electrode 18 toward the emitter section 16. Further, even if ionization occurs due to the electron emission, the protective film 30 reduces the damages of the cathode electrode 18 by the positive ions.

Figure 13:
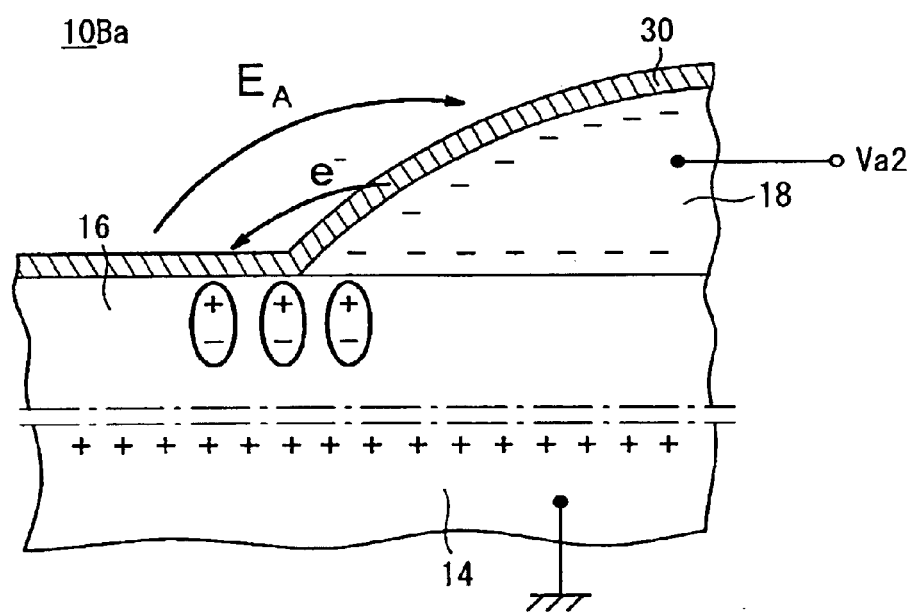
FIG. 13 is a view showing operation in a first modification of the electron emitter according to the second embodiment.

FIG. 13 is a view showing an electron emitter 10Ba of a first modification. The electron emitter 10Ba has a protective film 30 made of a conductor. The protective film 30 is likely to be eroded by the emitted electrons. The conductor should have a small sputtering yield (the number of target atoms or molecules per one incident ion). Preferably, the conductor has a sputtering yield of 2.0 or less at 600V in $Ar^+$. Further, since the protective film 30 is evaporated due to the Joule heat, the ionization by the emitted electrons occurs easily. Therefore, the conductor should have a high evaporation temperature in vacuum. Preferably, the conductor has an evaporation temperature of 1800 K or higher in vacuum at an evaporation pressure of $1.3 \times 10^{-3}$ Pa.

As described above, if the protective film 30 is made of a Conductor, preferably, the conductor has a sputtering yield of 2.0 or less, and an evaporation temperature of 1800K or higher in vacuum. The ordinary conductor such as Au has a high spattering yield 2.8 (AU), and not suitable for the protective film 30. Conductors having a high sputtering yield such as Mo (molybdenum) or C (carbon) are suitable. The sputtering yield of Mo is 0.9, and the sputtering yield of C is less than 0.2.

By selecting the material of the conductor, the protective film 30 is not broken easily. Therefore, the protective film 30 is not evaporated into atoms due to the Joule heat. Thus, the electron emitter 10Ba may have a longer service life.

Preferably, the protective film 30 has a thickness in the range of 1 nm to 20 nm. If the protective film 30 is too thin, the protective film 30 can not sufficiently protect the emitter section 16. If the protective film 30 is too thick, the protective film 30 has a small electric resistance, and the voltage between the local cathode and the local anode is small. Therefore, sufficient electric field for emitting electrons may not be generated. Further, if the protective film 30 is too thick, the cathode electrode 18 can not emit electrons.

Figure 14:
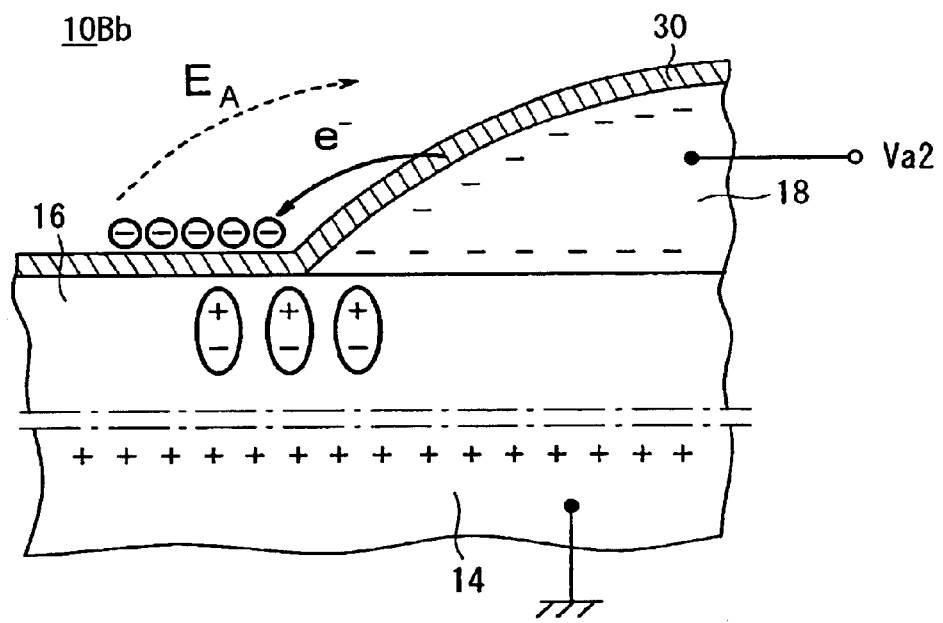
FIG. 14 is a view showing operation in a second modification of the electron emitter according to the second embodiment.

FIG. 14 is a view showing an electron emitter 10Bb of a second modification. In the electron emitter 10Bb, the protective film 30 is an insulator film such as $SiO_2$, or a metal oxide film such as MgO. Alternatively, the protective film 30 may be made of ceramics, a piezoelectric material, an anti-ferroelectric material, or an electrostrictive material.

When the electrons emitted from the cathode electrode 18 is attracted to the local anode of the emitter section 16, the surface of the protective film 30 is charged negatively. Therefore, the positive polarity of the local anode is weakened, the electric field between the local anode and the local cathode is weakened, and the intensity $E_A$ of the electric field between the local anode and the local cathode is reduced (the small intensity $E_A$ of the electric field is indicated by the broken-line arrow in FIG. 13). Thus, the electron emission is stopped.

In the electron emitter 10A of the first embodiment, the electron emission is self-stopped when the surface of the emitter section 16 is charged negatively. In the electron emitter 10Bb of the second modification, the electron emission is self-stopped when the surface of the protective film 30 is charged negatively.

When the protective film 30 is an insulator film or an oxide film, the protective film 30 is not eroded by the electrons emitted from the cathode electrode 18. Therefore, the protective film 30 is suitably used for protection.

Next, an electron emitter 10C according to a third embodiment will be described with reference to FIG. 15.

Figure 15:
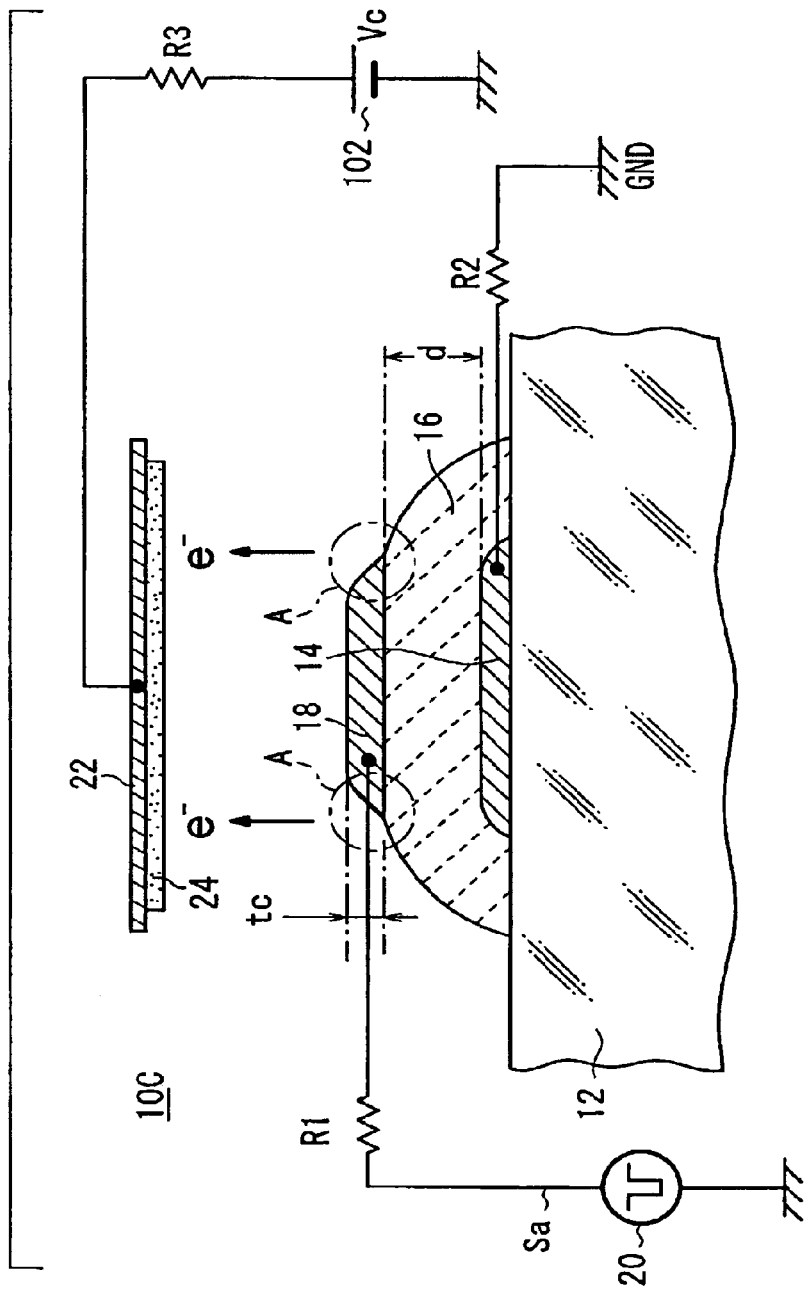
FIG. 15 is a view showing an electron emitter according to a third embodiment.

As shown in FIG. 15, the electron emitter 10C according to the third embodiment has substantially the same structure as the electron emitter 10A according to the first embodiment, but differs from the electron emitter 10A in that the electron emitter 10C includes one substrate 12, an anode electrode 14 is formed on the substrate 12, the emitter section 16 is formed on the substrate 12 to cover the anode electrode 14, and the cathode electrode 18 is formed on the emitter section 16.

As with the electron emitter 10A according to the first embodiment, the electron emitter 10C can prevent damage to the cathode electrode 18 by the positive ions, and has a long service life.

The emitter section 16 may be formed on the substrate 12 by any of various thick-film forming processes including screen printing, dipping, coating, electrophoresis, etc., or any of various thin-film forming processes including an ion beam process, sputtering, vacuum evaporation, ion plating, chemical vapor deposition (CVD), plating, etc.

In the third embodiment, the emitter section 16 is formed suitably by any of various thick-film forming processes including screen printing, dipping, coating, electrophoresis, etc.

These thick-film forming processes are capable of providing good piezoelectric operating characteristics as the electric field receiving member 16 can be formed using a paste, a slurry, a suspension, an emulsion, a sol, or the like which is chiefly made of piezoelectric ceramic particles having an average particle diameter ranging from 0.01 to 5 μm, preferably from 0.05 to 3 μm.

In particular, electrophoresis is capable of forming a film at a high density with high shape accuracy, and has features described in technical documents such as "Electrochemistry Vol. 53. No. 1 (1985), p. 63–68, written by Kazuo Anzai", and "The 1$^{st}$ Meeting on Finely Controlled Forming of Ceramics Using Electrophoretic Deposition Method, Proceedings (1998), p. 5–6, p. 23–24". The piezoelectric/electrostrictive/anti-ferroelectric material may be formed into a sheet, or laminated sheets. Alternatively, the laminated sheets of the piezoelectric/electrostrictive/anti-ferroelectric material may be laminated on, or attached to another supporting substrate. Any of the above processes may be chosen in view of the required accuracy and reliability.

The substrate 12 should preferably be made of an electrically insulative material depending on the electrical circuit requirements. Thus, the substrate 12 may be made of a highly heat-resistant metal or a metal material such as an enameled metal whose surface is coated with a ceramic material such as glass or the like. However, the substrate 12 should preferably be made of ceramics.

Ceramics which the substrate 12 is made of include stabilized zirconium oxide, aluminum oxide, magnesium oxide, titanium oxide, spinel, mullite, aluminum nitride, silicon nitride, glass, or a mixture thereof. Of these ceramics, aluminum oxide or stabilized zirconium oxide is preferable from the standpoint of strength and rigidity. Stabilized zirconium oxide is particularly preferable because its mechanical strength is relatively high, its tenacity is relatively high, and its chemical reaction with the cathode electrode 18 and the anode electrode 14 is relatively small. Stabilized zirconium oxide includes stabilized zirconium oxide and partially stabilized zirconium oxide. Stabilized zirconium oxide does not develop a phase transition as it has a crystalline structure such as a cubic system.

Zirconium oxide develops a phase transition between a monoclinic system and a tetragonal system at about 1000° C. and is liable to suffer cracking upon such a phase transition. Stabilized zirconium oxide contains 1 to 30 mol % of a stabilizer such as calcium oxide, magnesium oxide yttrium oxide, scandium oxide, ytterbium oxide, cerium oxide, or an oxide of a rare earth metal. For increasing the mechanical strength of the substrate 12, the stabilizer should preferably contain yttrium oxide. The stabilizer should preferably contain 1.5 to 6 mol % of yttrium oxide, or more preferably 2 to 4 mol % of yttrium oxide, and furthermore should preferably contain 0.1 to 5 mol % of aluminum oxide.

The crystalline phase may be a mixed phase of a cubic system and a monoclinic system, a mixed phase of a tetragonal system and a monoclinic system, a mixed phase of a cubic system, a tetragonal system, and a monoclinic system, or the like. The main crystalline phase which is a tetragonal system or a mixed phase of a tetragonal system and a cubic system is optimum from the standpoints of strength, tenacity, and durability.

If the substrate 12 is made of ceramics, then the substrate 12 is made up of a relatively large number of crystalline particles. For increasing the mechanical strength of the substrate 12, the crystalline particles should preferably have an average particle diameter ranging from 0.05 to 2 μm, or more preferably from 0.1 to 1 μm.

Each time the emitter section 14, the cathode electrode 18, or the anode electrode 14 is formed, the assembly is heated (sintered) into a structure integral with the substrate 12. After the emitter section 16, the cathode electrode 18, and the anode electrode 14 are formed, they may simultaneously be sintered so that they may simultaneously be integrally coupled to the substrate 12. Depending on the process by which the cathode electrode 18 and the anode electrode 14 are formed, they may not be heated (sintered) so as to be integrally combined with the substrate 12.

The sintering process for integrally combining the substrate 12, the emitter section 16, the cathode electrode 18, and the anode electrode 14 may be carried out at a temperature ranging from 500 to 1400° C., preferably from 1000 to 1400° C. For heating the emitter section 16 which is in the form of a film, the emitter section 16 should be sintered together with its evaporation source while their atmosphere is being controlled so that the emitter section 16 does not have an unstable composition due to the high temperature.

The emitter section 16 may be covered with an appropriate member for preventing the surface thereof from being directly exposed to the sintering atmosphere when the emitter section 16 is sintered. The covering member should preferably be made of the same material as the substrate 12.

Figure 16:
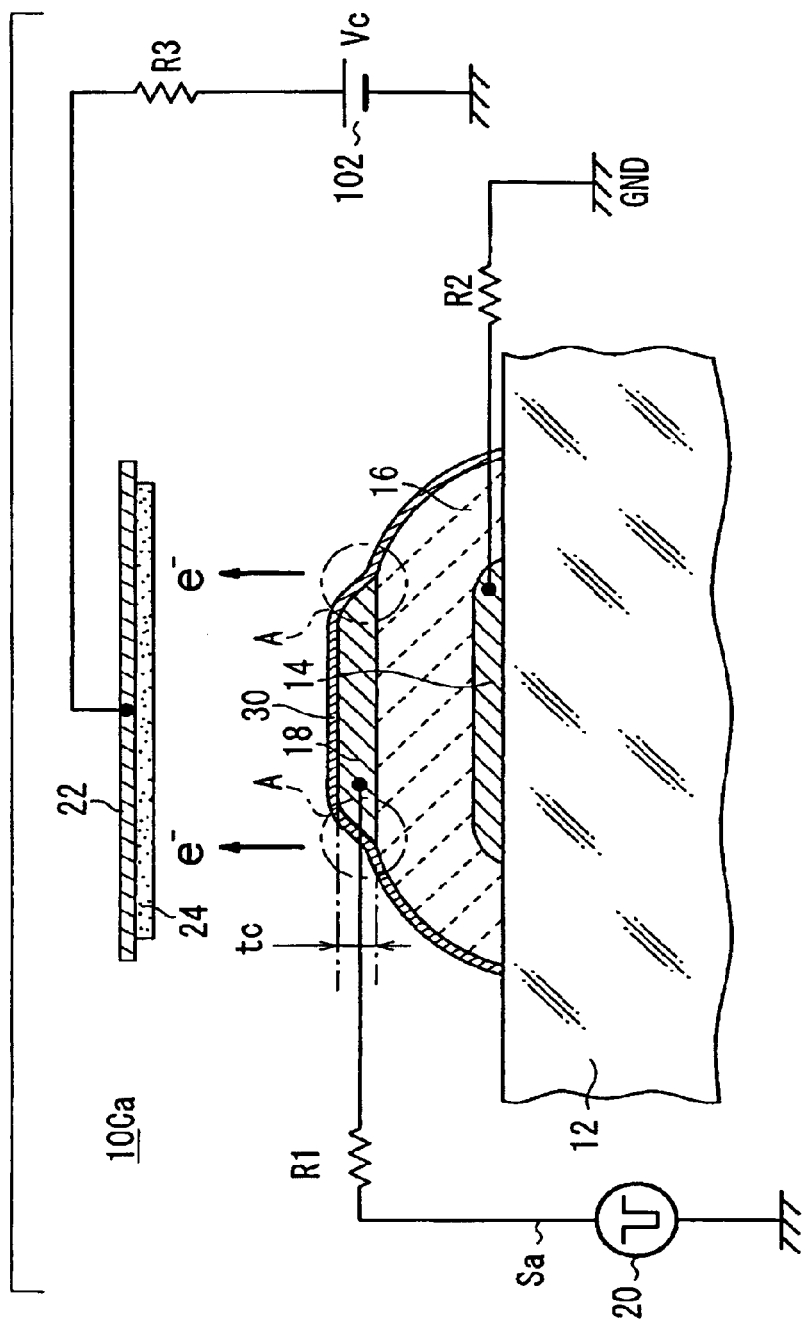
FIG. 16 is a view showing a modification of the electron emitter according to the third embodiment.

A protective film 30 may be formed on the emitter section 16 to cover the cathode electrode 18 as in an electron emitter 10Ca according to a modification shown in FIG. 16.

In the modification, one electron emitter 10 includes one emitter section 16, and one cathode electrode 18 and one anode electrode 14 formed on the emitter section 16. Alternatively, a plurality of electron emitters 10(1), 10(2), 10(3) may be formed using one emitter section 16 as shown in FIG. 17, for example.

Figure 17:
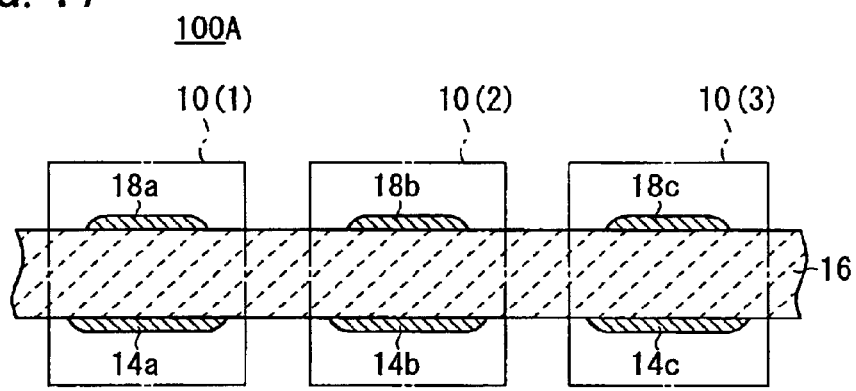
FIG. 17 is a view showing a first example in which a plurality of electron emitters are combined.

Specifically, In the first example 100A shown in FIG. 17, a plurality of cathode electrodes 18a, 18b, 18c are formed independently on a front surface of one emitter section 16, and a plurality anode electrodes 14a, 14b, 14c are formed on a back surface of the emitter section 16 to form the plurality of electron emitters 10(1), 10(2), 10(3). The anode electrodes 14a, 14b, 14c are provided under the corresponding cathode electrodes 18a, 18b, 18c. The emitter section 16 is interposed between the anode electrodes 14a, 14b, 14c and the cathode electrodes 18a, 18b, 18c.

Figure 18:
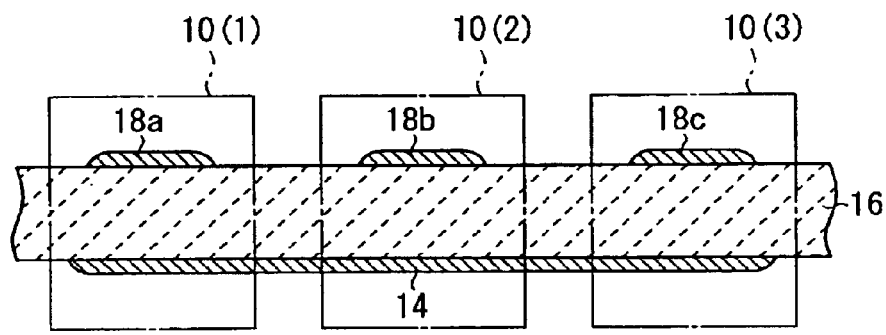
FIG. 18 is a view showing a second example in which a plurality of electron emitters are combined.

In a second example 100B shown in FIG. 18, a plurality of cathode electrodes 18a, 18b, 18c are formed independently on a front surface of one emitter section 16, and one anode electrode 14 (common anode electrode) is formed on a back surface of the emitter section 16 to form a plurality of electron emitters 10(1), 10(2), 10(3).

Figure 19:
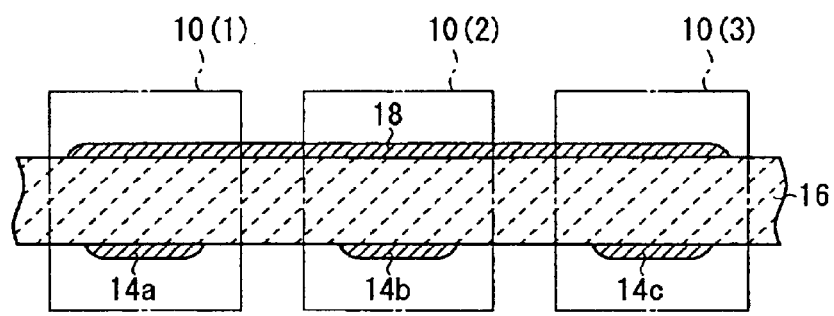
FIG. 19 is a view showing a third example in which a plurality of electron emitters are combined.

In a third example 100C shown in FIG. 19, one very thin (up to 10 nm) cathode electrode 18 (common cathode electrode) is formed on a front surface of one emitter section 16, and a plurality of anode electrodes 14a, 14b, 14c are formed independently on a back surface of the emitter section 16 to form a plurality of electron emitter 10(1), 10(2), 10(3).

Figure 20:
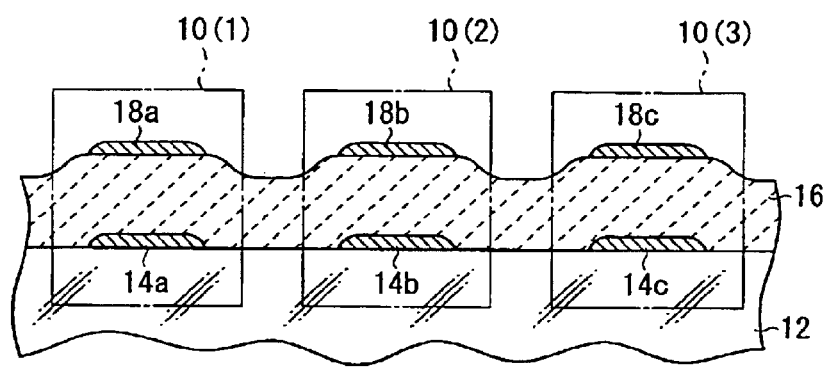
FIG. 20 is a view showing a fourth example in which a plurality of electron emitters are combined.

In a fourth example 100D shown in FIG. 20, a plurality of anode electrodes 14a, 14b, 14c are formed independently on a substrate 12, one emitter section 16 is formed to cover these anode electrodes 14a, 14b, 14c, and a plurality of cathode electrodes 18a, 18b, 18c are formed independently on the emitter section 16. The cathode electrodes 18a, 18b, 18c are provided above the corresponding anode electrodes 14a, 14b, 14c. The emitter section 16 is interposed between the anode electrodes 14a, 14b, 14c and the cathode electrodes 18a, 18b, 18c.

Figure 21:
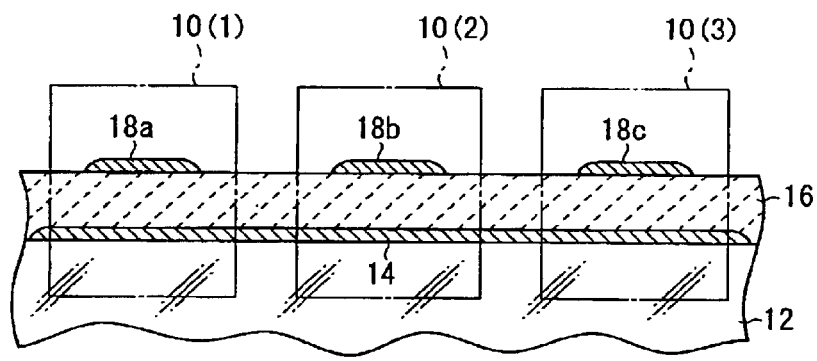
FIG. 21 is a view showing a fifth example in which a plurality of electron emitters are combined.

In a fifth example 100E shown in FIG. 21, one anode electrode 14 is formed on a substrate 12, and one emitter section 16 is formed to cover the anode electrode 14, and a plurality of cathode electrodes 18a, 18b, 18c are formed independently on the emitter section 16 to form a plurality of electron emitters 10(1), 10(2), 10(3).

Figure 22:
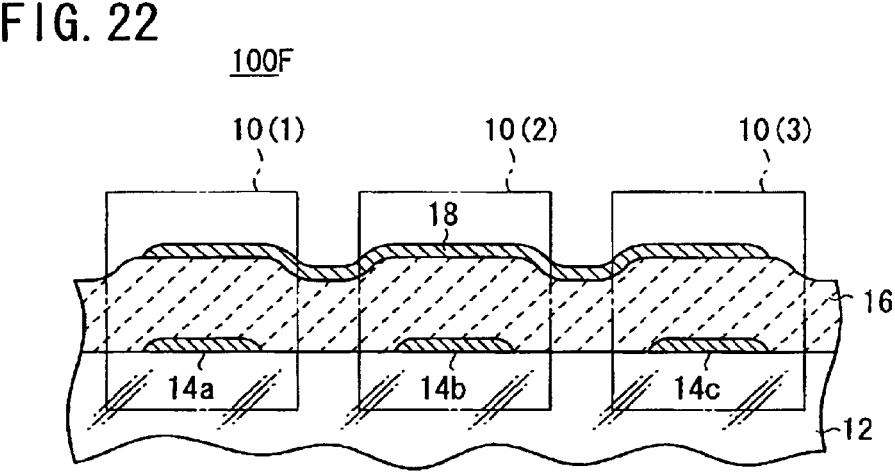
FIG. 22 is a view showing a sixth example in which a plurality of electron emitters are combined.

In a sixth example 100F shown in FIG. 22, a plurality of anode electrodes 14a, 14b, 14c are formed independently on a substrate 12, one emitter section 16 is formed to cover these anode electrodes 14a, 14b, 14c, and one very thin cathode electrode 18 is formed on the emitter section 16 to form a plurality of electron emitters 10(1), 10(2), 10(3).

In the first through six examples 100A through 100F, a plurality of electron emitters 10(1), 10(2), 10(3) are formed using one emitter section 16. As described later, the electron emitters 10(1), 10(2), 10(3) are suitably used as pixels of a display.

In the electron emitters 10A through 10C according to the first through third embodiments (including the modifications), the collector electrode 22 is coated with a fluorescent layer 24 to for use as a pixel of a display. The displays of the electron emitters 10A through 10C offer the following advantages:

(1) The displays can be thinner (the panel thickness= several mm) than CRTs.

(2) Since the displays emit natural light from the fluorescent layer 24, they can provide a wide angle of view which is about 180° unlike LCDs (liquid crystal displays) and LEDs (light-emitting diodes).

(3) Since the displays employ a surface electron source, they produce less image distortions than CRTs.

(4) The displays can respond more quickly than LCDs, and can display moving images free of after image with a high-speed response on the order of $\mu$sec.

(5) The displays consume an electric power of about 100 W in terms of a 40-inch size, and hence is characterized by lower power consumption than CRTs, PDPs (plasma displays), LCDs, and LEDs.

(6) The displays have a wider operating temperature range (−40 to +85° C.) than PDPs and LCDs. LCDs have lower response speeds at lower temperatures.

(7) The displays can produce higher luminance than conventional FED displays as the fluorescent material can be excited by a large current output.

(8) The displays can be driven at a lower voltage than conventional FED displays because the drive voltage can be controlled by the polarization reversing characteristics and film thickness of the piezoelectric material.

Because of the above various advantages, the displays can be used in a variety of applications described below.

(1) Since the displays can produce higher luminance and consume lower electric power, they are optimum for use as 30- through 60-inch displays for home use (television and home theaters) and public use (waiting rooms, karaoke rooms, etc.).

(2) Inasmuch as the displays can produce higher luminance, can provide large screen sizes, can display full-color images, and can display high-definition images, they are optimum for use as horizontally or vertically long, specially shaped displays, displays in exhibitions, and message boards for information guides.

(3) Because the displays can provide a wider angle of view due to higher luminance and fluorescent excitation, and can be operated in a wider operating temperature range due to vacuum modularization thereof, they are optimum for use as displays on vehicles. Displays for use on vehicles need to have a horizontally long 8-inch size whose horizontal and vertical lengths have a ratio of 15:9 (pixel pitch=0.14 mm), an operating temperature in the range from −30 to +85° C., and a luminance level ranging from 500 to 600 cd/m² in an oblique direction.

Because of the above various advantages, the electron emitters can be used as a variety of light sources described below.

(1) Since the electron emitters can produce higher luminance and consume lower electric power, they are optimum for use as projector light sources which are required to have a luminance level of 200 lumens.

(2) Because the electron emitters can easily provide a high-luminance two-dimensional array light source, can be operated in a wide temperature range, and have their light emission efficiency unchanged in outdoor environments, they are promising as an alternative to LEDs. For example, the electron emitters are optimum as an alternative to two-dimensional array LED modules for traffic signal devices. At 25° C. or higher, LEDs have an allowable current lowered and produce low luminance.

The electron emitter according to the present invention are not limited to the above embodiments, but may be embodied in various arrangement without departing from the scope of the present invention.

What is claimed is:

1. An electron emitter comprising:
an emitter section made of a dielectric matarial;
a first electrode formed on a first surface of said emitter section; and
a second electrode formed on a second surface of said emitter section, wherein
a drive voltage is applied between said first electrode and said second electrode to induce emission of electrons from at least a portion of said emitter section, and
polarization reversal occurs in an electric field E applied to said emitter section represented by E=Vak/d, where d is a thickness of said emitter section between said first electrode and said second electrode, and Vak is a voltage applied between said first electrode and said second electrode and is less than a dielectric breakdown voltage of said emitter section.

2. An electron emitter according to claim 1, wherein said drive voltage is applied between said first electrode and said second electrode such that said first electrode has a potential lower than a potential of said second electrode to reverse polarization of at least a portion of said emitter section; and
the polarization reversal causes emission of electrons in the vicinity of said first electrode.

3. An electron emitter according to claim 1, wherein
said second electrode is formed on a substrate;
said emitter section is formed on said substrate to cover said second electrode; and
said first electrode is formed on said emitter section.

4. An electron emitter according to claim 1, wherein said emitter section in made of a piezoelectric material, an anti-ferroelectric material, or an electrostrictive material.

5. An electron emitter according to claim 1, wherein a third electrode is provided above said first electrode, and said third electrode is coated with a fluorescent layer.

6. An electron emitter according to claim 1, wherein at least said first electrode has a ring shape.

7. An electron emitter according to claim 1, wherein at least said first electrode has a comb teeth shape.

8. An electron emitter according to claim 1, wherein said first electrode has a thickness of 100 nm or less.

9. An electron emitter comprising:
an emitter section made of a dielectric material;
a first electrode formed on a first surface of said emitter section; and
a protective film formed on said emitter section to cover said first electrode, said protective film being made of a conductor having a spurtering yield of 2.0 or less at 600 V in Ar⁺ and having an evaporation temperature of 1800 K or higher at an evaporation pressure of $1.3 \times 10^{-3}$ Pa; and
a second electrode formed on a second surface of said emitter section, wherein
a drive voltage is applied between said first electrode and said second electrode to induce emission of electrons from at least a portion of said emitter section.

10. An electron emitter according to claim 9, wherein said protective film has a thickness in the range of 1 nm to 20 nm.

11. An electron emitter according to claim 9, wherein said protective film is an insulator film.

12. An electron emitter according to claim 9, wherein said protective film is a metal oxide film.

13. An electron emitter according to claim 9, wherein said protective film is made of ceramics, a piezoelectric material, an anti-ferroelectric material, or an electrostrictive material.

14. An electron emitter comprising:
an emitter section made of a dielectric material;
a first electrode formed on a first surface of said emitter section; and
a second electrode formed on a second surface of said emitter section, wherein
a drive voltage is applied between said first electrode and said second electrode to induce emission of electrons from at least a portion of said emitter section, and
a change of voltage applied between said first electrode and said second electrode at a time of electron emission is 20V or less.

15. An electron emitter comprising:
an emitter section made of a dielectric material;
a first electrode formed on a first surface of said emitter section; and
a second electrode formed on a second surface of said emitter section, wherein
said first electrode, said emitter section, and a vacuum atmosphere define a triple point,
a drive voltage is applied between said, first electrode and said second electrode to reverse polarization of at least a portion of said emitter section, and
the polarization reversal causes positive poles of dipole moments in the vicinity of said first electrode to be oriented toward said first electrode, inducing emission of primary electrons from a portion of said first electrode in the vicinity of said triple point, and said emitted primary electrons impinge upon said emitter section to induce emission of secondary electrons from said emitter section.

16. An electron emitter comprising:
an emitter section made of a dielectric material;
a first electrode formed on a first surface of said emitter section; and
a second electrode formed on a second surface of said emitter section, wherein
a drive voltage is applied between said first electrode and said second electrode to induce emission of electrons from at least a portion of said emitter section, polarization reversal occurs in an electric field E applied to said emitter section represented by $E=V_{ak}/d$, where d is a thickness of said emitter section between said first electrode and said second electrode and $V_{ak}$ is a voltage applied between said first electrode and said second electrode, said thickness d being determined so that the voltage $V_{ak}$ applied between said first electrode and said second electrode has an absolute value of less than 100V.

* * * * *